United States Patent
Kobayashi et al.

(10) Patent No.: US 7,004,048 B2
(45) Date of Patent: Feb. 28, 2006

(54) VEHICLE STEERING HANDLE

(75) Inventors: Masahide Kobayashi, Wako (JP); Tatsuki Miyashita, Wako (JP); Katsutoshi Noguchi, Wako (JP); Ichiro Tobisawa, Wako (JP)

(73) Assignee: Honda Giken Kogyo Kabushiki Kaisha, Minato-ku (JP)

( * ) Notice: Subject to any disclaimer, the term of this patent is extended or adjusted under 35 U.S.C. 154(b) by 18 days.

(21) Appl. No.: 10/269,184

(22) Filed: Oct. 10, 2002

(65) Prior Publication Data

US 2003/0066379 A1    Apr. 10, 2003

(30) Foreign Application Priority Data

Oct. 10, 2001    (JP)    ............................. 2001-312534

(51) Int. Cl.
  *B62D 1/04*    (2006.01)
(52) U.S. Cl. ...................................... 74/552
(58) Field of Classification Search ................. 74/552;
  280/263, 771, 778; 180/315, 400, 423, 444;
  701/41
  See application file for complete search history.

(56) References Cited

U.S. PATENT DOCUMENTS 6,491,128 B1    12/2002  Lehmann et al. ............ 180/315

FOREIGN PATENT DOCUMENTS

| DE | 29907180 | 11/1999 |
| DE | 19919278 | 11/2002 |
| JP | 06-227423 | 8/1994 |
| JP | 06305426 A | * 11/1994 |
| WO | WO00/34107 | 7/2000 |

OTHER PUBLICATIONS

Haddad et al., Adjustable Diameter Steering Wheel, Jun. 23, 1970.*

* cited by examiner

*Primary Examiner*—Chong H. Kim
(74) *Attorney, Agent, or Firm*—Hamre, Schumann, Mueller & Larson, P.C.

(57) ABSTRACT

A steering handle includes a hub mounted to a steering shaft and a pair of grips mounted to the left and right of the hub. The left and right grips are gripped by a driver for steering. The left and right grips are radially slidable with respect to the hub. This allows the wheel diameter to be changed for application to various types of vehicles.

4 Claims, 8 Drawing Sheets

VEHICLE STEERING HANDLE

FIELD OF THE INVENTION

The present invention relates to an improvement in a vehicle steering handle.

BACKGROUND OF THE INVENTION

Some vehicle steering handles are of a type having a hub mounted to a steering shaft provided with a pair of left and right grips to be gripped by a driver for steering. An art of this kind in steering handles is disclosed in, for example, Japanese Patent Laid-Open Publication No. HEI-11-59434 entitled "Vehicle Steering handle".

Steering torque of this steering handle is transmitted via a steering shaft, a steering angle controllable device and a rack-and-pinion mechanism, to a rack shaft, thereby to steer steered wheels. The steering angle controllable device varies the ratio of the steered angle of the steered wheels to the steering angle of the steering handle. The steering handle is provided, at a boss (corresponding to a hub) mounted to the steering shaft, with a pair of left and right grips to be gripped by a driver for steering.

The wheel diameter of the steering handle depends on the type of vehicle. Steering handles of smaller wheel diameters which allow quick steering are widely used in automobiles such as sports cars. Steering handles of larger wheel diameters which provide a slow steering feeling are widely used in heavy vehicles such as trucks and buses. This indicates the necessity of preparing various kinds of steering handles in accordance with the types of vehicles. Preparing various kinds of steering handles leads to difficulty in management, which leaves room for improvement.

Further, in recent years, there have been demands that wheel diameters be changed to meet drivers' preferences. For example, there have been demands for individual wheel diameters in accordance with the body types of drivers or demands that a steering feeling be changed in accordance with vehicle speed.

In this context, a steering handle which can be used in various types of vehicles and can be changed in diameter to suit the preferences of drivers is desired.

SUMMARY OF THE INVENTION

According to the present invention, there is provided a vehicle steering handle, which comprises: a hub mountable to a steering shaft; and a pair of left and right grips radially slidably mounted to the hub, to be gripped by a driver for steering, whereby the wheel diameter is changeable.

Thus radially sliding the left and right grips with respect to the hub allows adjustment of the wheel diameter in accordance with the type of vehicle and allows a single kind of steering handles to be applied to various types of vehicles. This eliminates the need for preparing various kinds of steering handles, thereby facilitating management. This further enables changing of the wheel diameter in accordance with the preferences of drivers or driving conditions.

The hub is mountable via the steering shaft to a variable steering angle ratio steering device for changing the ratio of the steered angle of steered wheels to the steering angle of the steering handle. That is, the ratio of the steered angle of steered wheels to the steering angle of the steering handle can be changed smaller so that the total steering angle of the steering handle required for steering the steered wheels to a maximum steered angle is as small as about 180 degrees. It is effective to mount the steering handle having the left and right grips to the variable steering angle ratio steering device.

The left and right grips are preferably slidable by an equal distance. The fact that the amount of sliding of the left grip is equal to the amount of sliding of the right grip allows an equal distance between the center of the hub and the left and right grips when the wheel diameter is changed, securing stable steerage of the steering handle.

Preferably, the hub has a lock mechanism for immovably locking the left and right grips within the range between the position when the wheel diameter is smallest and the position when the wheel diameter is largest. The left and right grips can thus be locked and fixed at a desired wheel diameter.

Further, the hub preferably has an electric motor for driving the left and right grips for sliding. Thus sliding the grips with the electric motor allows automatic adjustment of sliding of the grips in accordance with the preferences of drivers and driving conditions. Housing the electric motor inside the hub prevents the electric motor from being exposed, improving the appearance of the steering handle despite the slidable configuration of the grips.

Driving of the electric motor is controlled by a controller. The controller controls the amount of sliding of the left and right grips via the electric motor in response to a speed signal from a speed sensor. That is, the electric motor drives the left and right grips for sliding in accordance with vehicle speed, preferably providing fine steerage in accordance with vehicle speed.

Further, in the inventive arrangement, a controller controls the amount of sliding of the left and right grips via the electric motor in response to a body type signal from a body type detector for detecting the body type of a driver. That is, the wheel diameter is preferably adjustable in accordance with the body type of a driver for steering comfort.

BRIEF DESCRIPTION OF THE DRAWINGS

Preferred embodiments of the present invention will be described in detail below, by way of example only, with reference to the accompanying drawings, in which.

DETAILED DESCRIPTION OF THE PREFERRED EMBODIMENTS

Figure 1:
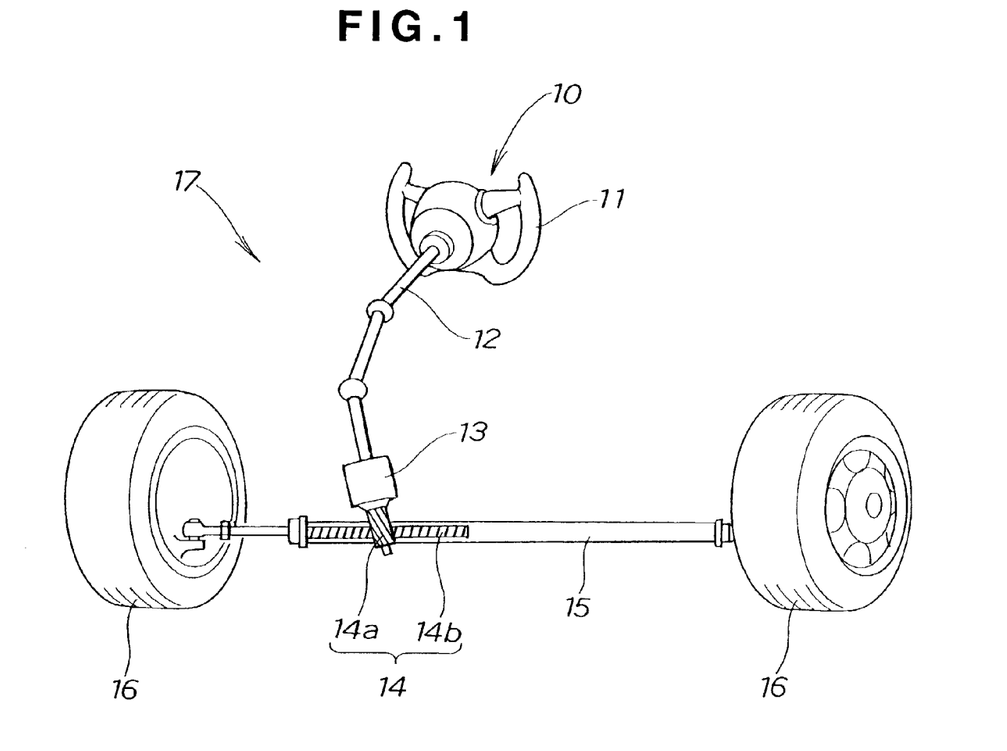
FIG. 1 is a schematic diagram of a vehicle steering system using a steering handle according to the present invention.

Reference is taken initially to FIG. 1 illustrating a vehicle steering system using a steering handle according to the present invention. This vehicle steering system 10 transmits steering torque of a steering handle 11 via a steering shaft 12, a variable steering angle ratio steering device 13 and a rack-and-pinion mechanism 14, to a rack shaft 15, thereby steering left and right steered wheels 16, 16. A vehicle 17 such as an automobile, truck or bus includes the vehicle steering system 10.

The variable steering angle ratio steering device 13 varies the ratio of the steered angle of the steered wheels 16, 16 to the steering angle of the steering handle 11. The rack-and-pinion mechanism 14 has a pinion 14a and a rack 14b.

Figure 2:
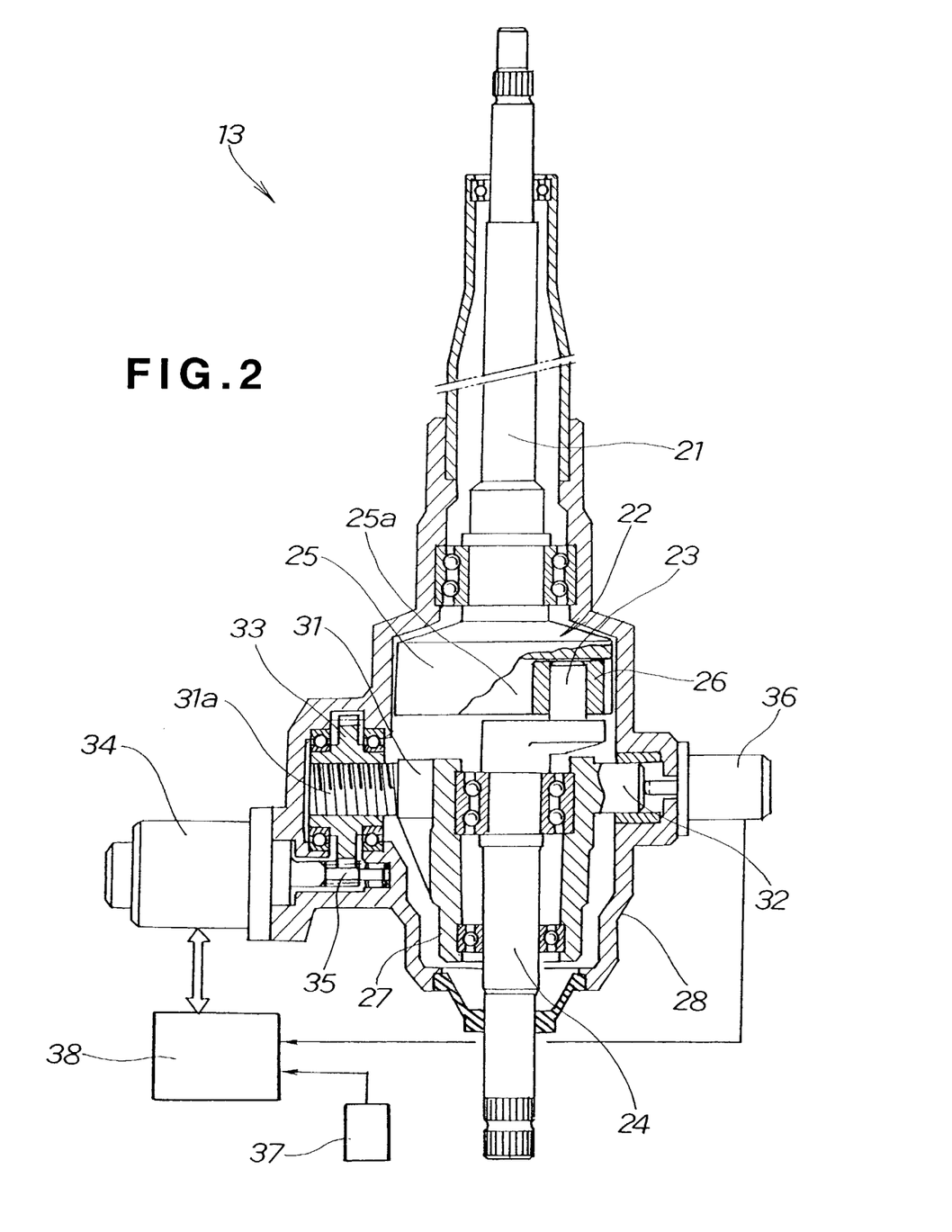
FIG. 2 is a cross-sectional view of details of a variable steering angle ratio steering device shown in FIG. 1.

FIG. 2 illustrates the variable steering angle ratio steering device 13. The variable steering angle ratio steering device 13 is a known device as disclosed in Japanese Patent Laid-Open Publication No. HEI-6-227423. General description of the variable steering angle ratio steering device 13 will be provided below.

The variable steering angle ratio steering device 13 has a first shaft 21 rotated by the steering shaft 12 shown in FIG. 1, a second shaft 23 coupled to the first shaft 21 via a coupling 22, and a third shaft 24 eccentrically and integrally formed with the second shaft 23. The third shaft 24 is coupled to the pinion 14a shown in FIG. 1 via an Oldham's coupling.

The coupling 22 has a flange 25 integrally formed with the distal end of the first shaft 21. The flange 25 has an elongate groove 25a radially formed in its end face. The second shaft 23 is slidably coupled to the groove 25a via a slider 26.

The third shaft 24 is rotatably supported by a support member 27. The support member 27 is supported inside a casing 28 in a radially displaceable manner. The first and second shafts 21 and 23 are housed in the casing 28. The support member 27 is controlled by a displacement motor 34 for radial displacement. More specifically, the support member 27 has a pair of support shafts 31 and 32 extending radially. The support shafts 31 and 32 are supported in a longitudinally movable manner. The support shaft 31 has a male thread 31a. The male thread 31a is screwed into a female thread of a gear 33. The gear 33 engages a pinion 35 of the displacement motor 34.

A displacement sensor 36 disposed at an end of the support shaft 32 detects the travel of the support member 27. That is, an eccentricity signal of the third shaft 24 supported by the support member 27 and a speed signal generated by a speed sensor 37 are supplied to a steering angle ratio controller 38 to control the displacement motor 34, thereby to meet the target amount of eccentricity set in accordance with speed. In this manner, the ratio of the steered angle of the steered wheels 16, 16 to the steering angle of the steering handle 11 shown in FIG. 1, that is, the steering angle ratio can be changed. For example, the steering angle ratio is adjusted larger at low-speed driving and smaller at high-speed driving.

FIGS. 3(a) and 3(b) illustrate the appearance of the steering handle according to the present invention.

The steering handle 11 shown in FIG. 3(a) has a hub 41 mounted to the steering shaft 12 shown in FIG. 1 and a pair of left and right grips 44L and 44R to be gripped by a driver for steering. The pair of left and right grips 44L and 44R is radially slidable with respect to the hub 41.

More specifically, the steering handle 11 has the left grip 44L and the right grip 44R. The left grip 44L is integrally formed between upper and lower spokes (an upper first left spoke 42L and a lower second left spoke 43L) extending radially outward from the left of the hub 41 in a round shape when viewed from the front. The right grip 44R is integrally formed between upper and lower spokes (an upper first right spoke 42R and a lower second right spoke 43R) extending radially outward from the right of the hub 41. The paired left and right grips 44L and 44R each have an ark shape generally along the contour of the hub 41 when viewed from the front, being in a symmetrical relationship.

The steering handle 11 shown in FIG. 3(a) has the smallest wheel diameter of D1 with the pair of left and right grips 44L and 44R contracted most. From this state, the pair of left and right grips 44L and 44R is extended radially outward.

The steering handle 11 shown in FIG. 3(b) has the largest wheel diameter of D2 with the pair of left and right grips 44L and 44R extended most. The amount of sliding of the left grip 44L is SL and the amount of sliding of the right grip 44R is SR. The paired left and right grips 44L and 44R are slidable by the same dimension (SL=SR). From this state, the pair of left and right grips 44L and 44R is contracted radially inward, returning to the state of FIG. 3(a).

Thus radially sliding the pair of left and right grips 44L and 44R with respect to the hub 41 in accordance with the vehicle type allows setting of a wheel diameter for each type of vehicles. The steering handle 11 of a single kind can be used in various types of vehicles. It is also possible to change the wheel diameter in accordance with the preferences of drivers or driving conditions.

Since the sliding amount SR of the right grip 44R is identical to the sliding amount SL of the left grip 44L, distances between the center of the hub 41 and the left and right grips 44L and 44R can be equalized when the wheel diameter is changed. This secures constant steerability of the steering handle 11.

Now a first embodiment of a slide mechanism for sliding the pair of left and right grips 44L and 44R will be described with reference to FIGS. 4 and 5.

Figure 3:
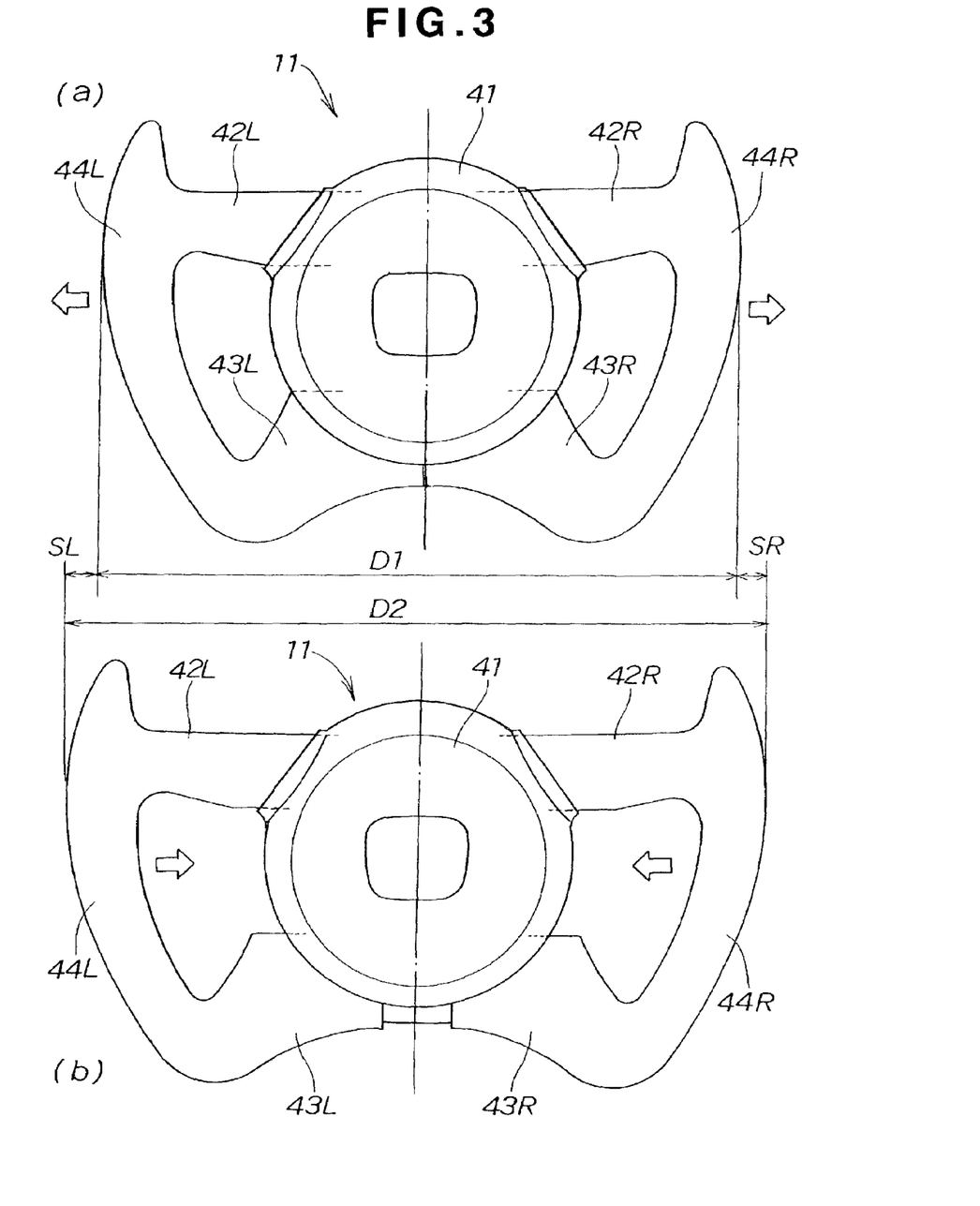
FIGS. 3(a) and 3(b) are front views illustrating details of the steering handle according to the present invention.
Figure 4:
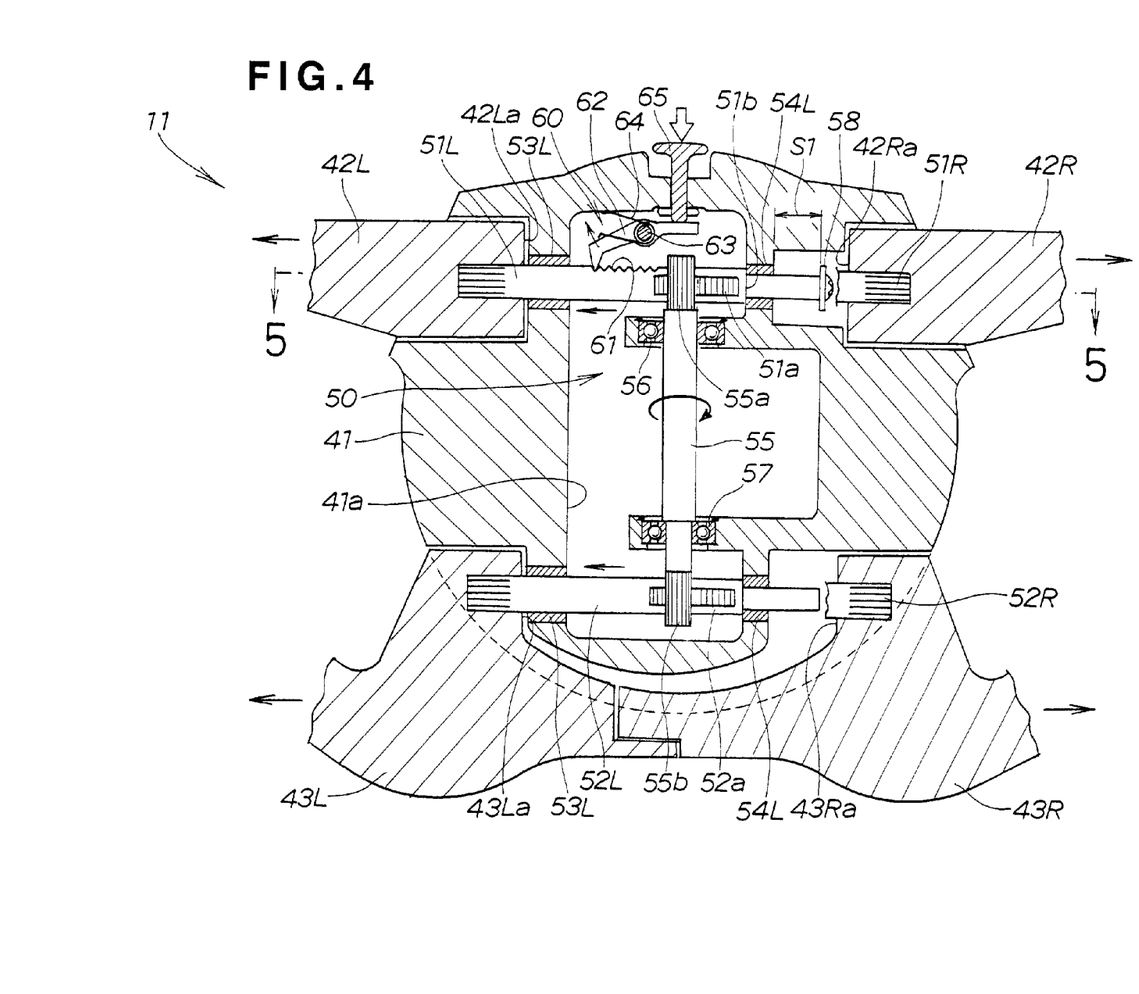
FIG. 4 is a cross-sectional view of a slide mechanism according to a first embodiment of the present invention.

FIG. 4 illustrates a slide mechanism 50 housed in the hub 41 when viewed from the front. The slide mechanism 50 of the first embodiment is manually operated to slide the pair of left and right grips 44L and 44R shown in FIG. 3. The slide mechanism 50 includes first and second left rack shafts 51L and 52L, first and second right rack shafts 51R and 52R, a pinion shaft 55 and a lock mechanism 60.

When the hub 41 is viewed from the front, a proximal end face 42Ra of the first right spoke 42R is opposite to a proximal end face 42La of the first left spoke 42L. A proximal end face 43Ra of the second right spoke 43R is opposite to a proximal end face 43La of the second left spoke 43L.

The first left rack shaft 51L is horizontally extended from the proximal end face 42La of the first left spoke 42L into the hub 41 (an inside space 41a of the hub 41), with the opposite ends thereof being slidably supported by the hub 41 via bearings 53L and 54L. Similarly, the first right rack shaft 51R is horizontally extended from the proximal end face 42Ra of the first right spoke 42R into the hub 41, with the opposite ends thereof being slidably supported by the hub 41 via bearings (See 53R and 54R shown in FIG. 5).

The second left rack shaft 52L is horizontally extended from the proximal end face 43La of the second left spoke 43L into the hub 41, with the opposite ends thereof being slidably supported by the hub 41 via bearings 53L and 54L. Similarly, the second right rack shaft 52R is horizontally extended from the distal end face 43Ra of the second right spoke 43R into the hub 41, with the opposite ends thereof being slidably supported by the hub 41 via bearings (See 53R and 54R shown in FIG. 5).

The first and second left rack shafts 51L and 52L and the first and second right rack shafts 51R and 52R are parallel with one another. Thus the first and second left spokes 42L and 43L and the first and second right spokes 42R and 43R are slidable in transverse directions with respect to the hub 41. As a result, the left and right grips 44L and 44R shown in FIG. 3 are radially slidable with respect to the hub 41.

The pinion shaft 55 is rotatably supported inside the hub 41 via bearings 56 and 57. The pinion shaft 55 extends across the rack shafts 51L, 51R, 52L and 52R at right angles. The pinion shaft 55 has a first pinion 55a and a second pinion 55b formed at its opposite ends. The first pinion 55a engages a rack 51a of the first left rack shaft 51L. The second pinion 55b engages a rack 52a of the second left rack shaft 52L. The first and second pinions 55a and 55b engage racks of the first and second right rack shafts 51R and 52R in the same manner, which is not shown.

The first left rack shaft 51L has a step 51b provided at its distal end portion and a stopper 58 attached to the distal end. One end of the first left rack shaft 51L is supported on the bearing 54L provided between the step 51b and the stopper 58, defining the sliding amount S1 of the first left rack shaft 51L. The sliding amount S1 is identical to the sliding amounts SL and SR of the left and right grips 44L and 44R shown in FIG. 3.

The lock mechanism 60 immovably locks the pair of left and right grips 44L and 44R. The lock mechanism 60 has latch teeth 61 formed longitudinally on the periphery of the first left rack shaft 51L with a predetermined pitch and a latch claw 62 for engagement and disengagement with and from the latch teeth 61. The latch claw 62 is rotatably supported on a support shaft 63. The latch claw 62 is constantly biased by a spring 64 in a direction to engage the latch teeth 61. The engagement of the latch claw 62 with the latch teeth 61 is released by pushing a push button 65 against the biasing force of the spring 64. The push button 65 is pushed from the peripheral side of the hub 41.

Figure 5:
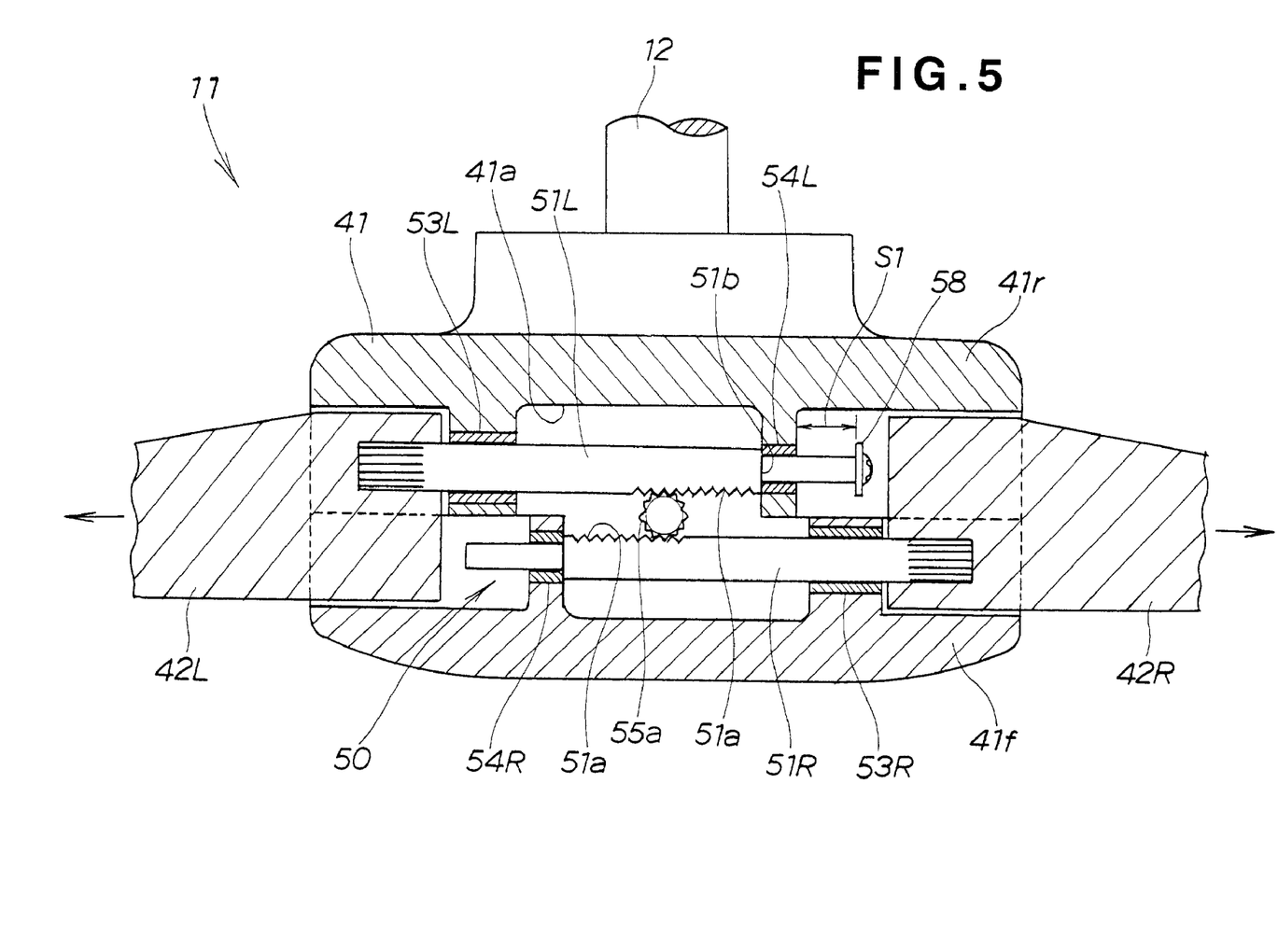
FIG. 5 is a cross-sectional view taken along line 5—5 of FIG. 4.

As shown in FIG. 5, the first pinion 55a is interposed between the rack 51a of the first left rack shaft 51L and the rack 51a of the first right rack shaft 51R. When the first left rack shaft 51L is slid, the first right rack shaft 51R is slid via the first pinion 55a in a direction opposite to that of the first left rack shaft 51L.

The second pinion 55b shown in FIG. 4 is also interposed between the rack 52a of the second left rack shaft 52L and the rack 52a of the second right rack shaft 52R. The second left rack shaft 52L and the second right rack shaft 52R thus slide via the second pinion 55b in opposite directions.

The hub 41 of the steering handle 11 is a halved member consisting of a front portion 41f and a rear portion 41r as shown in FIG. 5.

Now the operation of the slide mechanism 50 of the first embodiment will be described with reference to FIGS. 3 and 4.

The steering handle 11 shown in FIG. 3(a) has the smallest diameter with the pair of left and right grips 44L and 44R contracted. The state of the slide mechanism at this time is shown in FIG. 4. Since the step 51b abuts against the bearing 54L, the left and right grips 44L and 44R cannot be further contracted. With this state, when the latch claw 62 engages the latch teeth 61, the left and right grips 44L and 44R are immobile and fixed.

When the push button 65 is pushed to disengage the latch claw 62 from the latch teeth 61 and the left grip 44L or the right grip 44R is pulled radially outward, the left and right grips 44L and 44R move radially outward. The wheel diameter is changed to any given dimension. Releasing the push button 65 at a desired amount of travel causes the latch claw 62 to engage again the latch teeth 61 by the resilient force of the spring 64, fixing the left and right grips 44L and 44R. The wheel diameter is adjusted as appropriate.

The left grip 44L or the right grip 44R is further pulled radially outward while the latch claw 62 is disengaged from the latch teeth 61. When the wheel diameter becomes largest as shown in FIG. 3(b), the stopper 58 strikes the bearing 54L and the left and right grips 44L and 44R cannot be further extended. When the push button 65 is released with this state, the latch claw 62 is engaged with the latch teeth 61 and the left and right grips 44L and 44R are immovably fixed.

As clear from the above description, the lock mechanism 60 can reliably maintain the position of the pair of left and right grips 44L and 44R contracted to the smallest wheel diameter or moved radially outward to the largest wheel diameter.

Now a slide mechanism 70 according to a second embodiment will be described with reference to FIGS. 6 and 7.

The slide mechanism 70 of the second embodiment is characterized in that a pair of left and right grips 44L and 44R (See FIG. 3) is slid with an electric motor 72. The slide mechanism 70 is an assemblage of first and second left rack shafts 51L and 52L, first and second right rack shafts 51R and 52R, a pinion shaft 55, a controller 71, the electric motor 72 and a power transmission mechanism 73. Other components are identical to those of the slide mechanism 50 of the first embodiment shown in FIGS. 4 and 5, with the same reference numerals affixed thereto, and will not be described.

A hub 41 houses the controller 71, electric motor 72 and power transmission mechanism 73. The controller 71 controls the driving of the electric motor 72 in response to a speed signal from a speed sensor 37. The electric motor 72 rotates in a forward or reverse direction upon receiving a control signal from the controller 71, rotating the pinion shaft 55 via the power transmission mechanism 73, and thereby driving the pair of left and right grips 44L and 44R shown in FIG. 3 for sliding. In this manner, the electric motor 72 operates in response to a speed signal from the speed sensor 37.

The power transmission mechanism 73 is a worm gear mechanism consisting of a worm 74 attached to an output shaft 72a of the electric motor 72 and a worm wheel 75 attached to the pinion shaft 55, engaging the worm 74. The worm gear mechanism has a self-lock function which prevents the electric motor 72 from being driven by force from the pinion shaft 55 at the load side. The "self-lock function" allows transmission of power from an input side to an output side and prevents transmission of power from the output side to the input side. The self-lock function of the second embodiment eliminates the need for the lock mechanism 60 of the first embodiment shown in FIG. 4.

Figure 7:
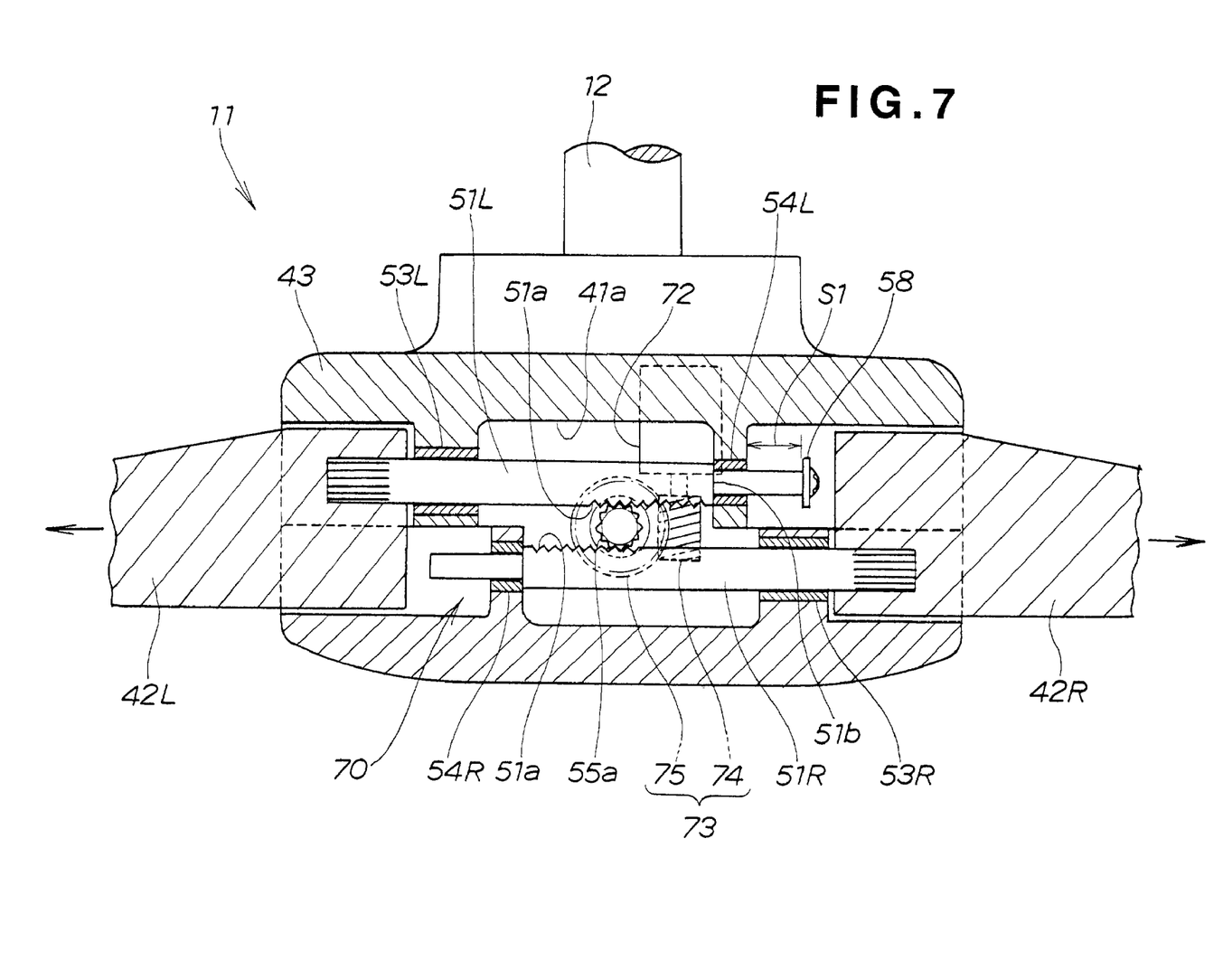
FIG. 7 is a cross-sectional view taken along line 7—7 of FIG. 6.

As shown in FIG. 7, a first pinion 55a is interposed between a rack 51a of the first left rack shaft 51L and a rack 51a of the first right rack shaft 51R. The power transmission mechanism 73 is interposed between the first pinion 55a and the electric motor 72.

Now the operation of the slide mechanism 70 according to the second embodiment will be described with reference to FIGS. 3 and 6.

The steering handle 11 shown in FIG. 3(a) has the smallest wheel diameter with the pair of left and right grips 44L and 44R contracted, as described above. The state of the slide mechanism 70 at this time is shown in FIG. 6. Since a step 51b abuts against a bearing 54L, the left and right grips 44L and 44R cannot be further contracted. Since the power transmission mechanism 73 has a self-lock function, the left and right grips 44L and 44R are made immobile and fixed.

The electric motor 72 operates in response to a speed signal of the speed sensor 37, rotating the pinion shaft 55 via the power transmission mechanism 73, and thereby sliding the first and second left rack shafts 51L and 52L and the first and second right rack shafts 51R and 52R via the racks 51a, 51a, 52b and 52b. When the left and right grips 44L and 44R slide, the diameter of the steering handle 11 is changed. In this manner, the wheel diameter can be adjusted as appropriate. The left and right grips 44L and 44R are made immobile and the radially outward motion of the steering handle 11 is fixed.

When the left grip 44L or the right grip 44R is further moved radially outward by the electric motor 72 to make the diameter of the steering handle 11 largest as shown in FIG. 3(b), the stopper 58 abuts against the bearing 54L. The left and right grips 44L and 44R cannot be further moved. In this state, the controller 71 controls the electric motor 72 to stop. The left and right grips 44L and 44R are made immobile.

Thus sliding the pair of left and right grips 44L and 44R via the electric motor 72 in accordance with vehicle speed provides fine steerage in accordance with vehicle speed. For example, the grips 44L and 44R are contracted to a smaller wheel diameter for quick steering at low-speed driving. At high-speed driving, the grips 44L and 44R are expanded to a larger wheel diameter, increasing the amount of steering (the amount of steerage of the grips 44L and 44R in a rotation direction required for obtaining a certain steering angle), and providing a slow steering feeling. In this manner, a steering feeling is optimized in accordance with vehicle speed.

Figure 8:
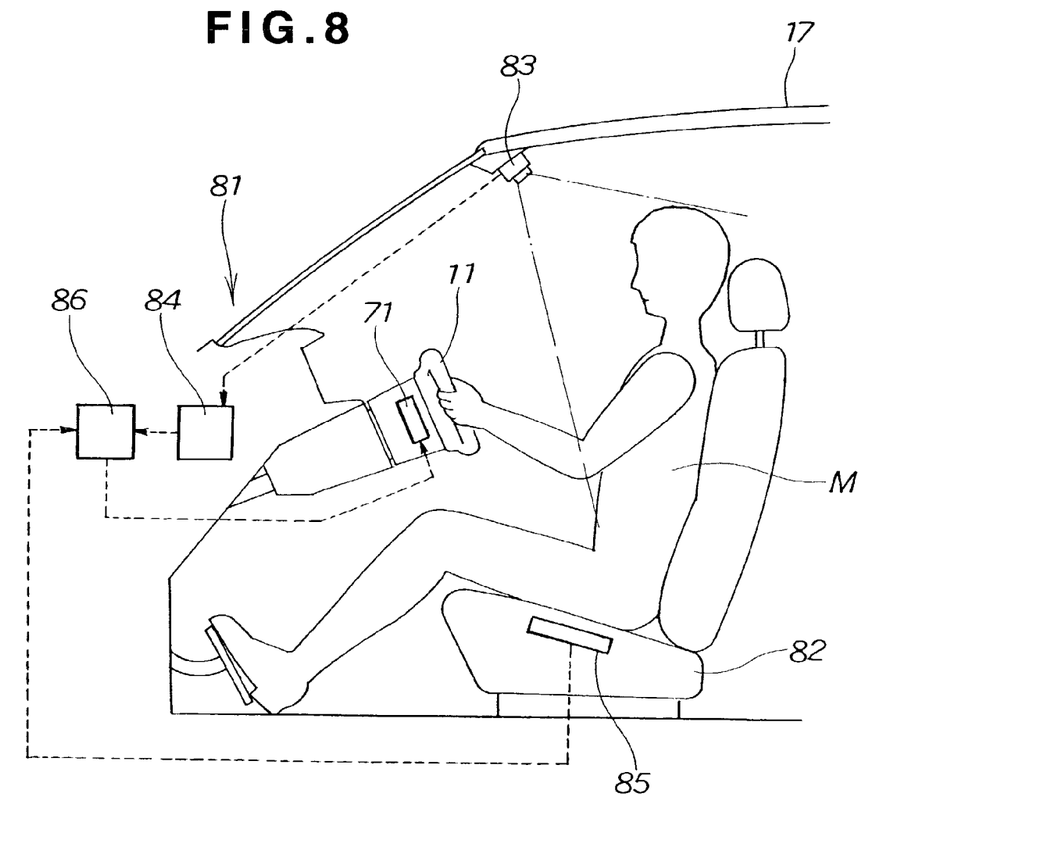
FIG. 8 is a diagram illustrating a modification of the slide mechanism according to the second embodiment.

Now a slide mechanism 70 according to a modification of the second embodiment will be described with reference to FIG. 8.

This modification is characterized in that the electric motor 72 (See FIG. 6) operates in response to a signal from a body type detector 81 for detecting the body type of a driver M.

The body type detector 81 is provided with a camera (such as a CCD camera) 83 for imaging the driver M sitting in a driver seat 82, an image processor 84 for processing an image signal received from the camera 83 and converting the signal into a body shape detection signal, a weight measuring sensor 85 for measuring the body weight of the driver M sitting in the driver seat 82, and a comparative determiner 86 for comparatively determining the body type of the driver M using a body shape detection signal and a body weight detection signal and sending a body type detection signal to the controller 71.

The comparative determiner 86 stores in advance a plurality of body shape patterns of the driver M and compares the body shape detection signal and the body weight detection signal with the body shape patters to identify the body type of the driver M. The comparative determiner 86 may identify the body type using one of the body shape detection signal and the body weight detection signal. The body type detector 81 may have any configuration as long as it has a function of detecting the body type of the driver M.

Figure 6:
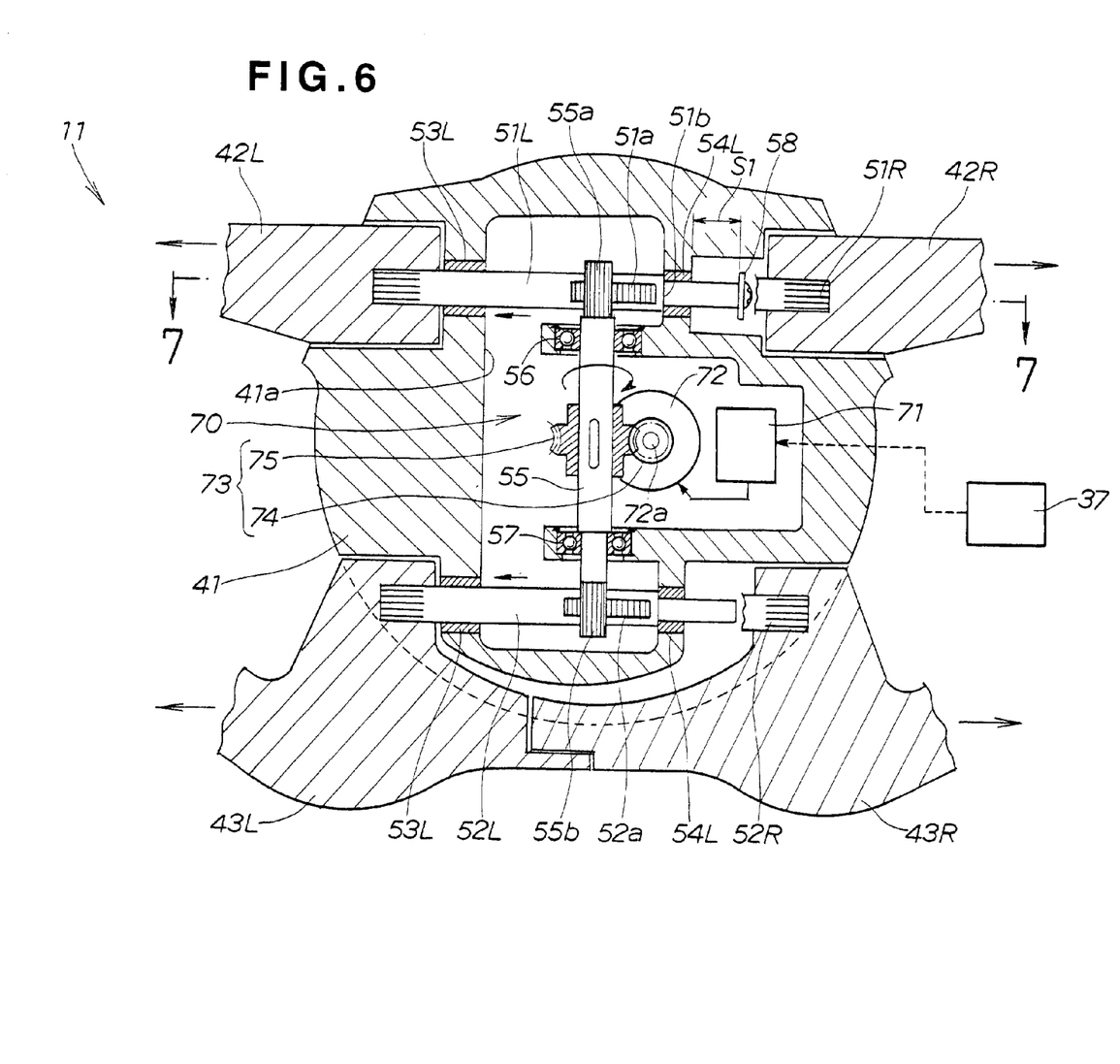
FIG. 6 is a cross-sectional view of a slide mechanism according to a second embodiment of the present invention.

According to this modification, the controller 71 can control the driving of the electric motor 72 in response to a signal from the body type detector 81 instead of a speed signal from the speed sensor 37 shown in FIG. 6, thereby changing the wheel diameter. The driver M can thus adjust the wheel diameter in accordance with his body type for steering comfort.

The present disclosure relates to the subject matter of Japanese Patent Application No. 2001-312534, filed Oct. 10, 2001, the disclosure of which is incorporated herein by reference in its entirety.

What is claimed is:

1. A steering handle for use in a vehicle, comprising:
   a hub designed to be mounted to a steering shaft of the vehicle;
   a pair of left and right grips for being gripped by a driver for steering, said grips being slidably mounted to said hub for undergoing sliding movement toward and away from each other in a radial direction of the hub so that a diameter of the steering handle is changeable;
   an electric motor disposed in said hub for driving said left and right grips to undergo sliding movement;
   a controller disposed in said hub for controlling the amount of sliding movement of said left and right grips via said electric motor in accordance with a vehicle speed in such a manner that the left and right grips move toward each other to achieve a steering handle with a small diameter when the vehicle is traveling at a low speed, and the left and right grips moves away from each other to achieve a steering handle with a large diameter when the vehicle is traveling at a high speed.

2. A steering handle as set forth in claim 1, wherein said hub is mountable via said steering shaft to a variable steering angle ratio steering device for changing the ratio of the steered angle of steered wheels relative to the steering angle of said steering handle.

3. A steering handle as set forth in claim 1, wherein said left and right grips are slidable by an equal distance.

4. A steering handle set forth in claim 1, wherein said controller controls the amount of sliding movement of said left and right grips via said electric motor in response to a body type signal from a body type detector for detecting the body type of the driver.

* * * * *